United States Patent

Gallo et al.

Patent Number: 5,362,074
Date of Patent: Nov. 8, 1994

[54] REINFORCED CORE HEAVY DUTY GASKET

[75] Inventors: Paul E. Gallo, Berwyn; Paul V. Rakauskas, Melrose Park, both of Ill.

[73] Assignee: Dana Corporation, Toledo, Ohio

[21] Appl. No.: 23,403

[22] Filed: Feb. 26, 1993

[51] Int. Cl.⁵ .................................... F16J 15/12
[52] U.S. Cl. .................... 277/233; 277/235 B
[58] Field of Search ............. 277/233, 234, 235 B

[56] References Cited

U.S. PATENT DOCUMENTS

| | | |
|---|---|---|
| 4,223,897 | 9/1980 | Staab et al. ............... 277/235 B X |
| 4,754,982 | 7/1988 | Udagawa et al. ........... 277/235 B |
| 4,765,633 | 8/1988 | Hossack . |
| 4,776,602 | 10/1988 | Gallo . |
| 4,810,454 | 3/1989 | Belter . |
| 4,813,687 | 3/1989 | Nakayama et al. . |
| 4,956,226 | 9/1990 | Ashizawa et al. ........ 277/235 B X |
| 5,062,649 | 11/1991 | Udagawa . |
| 5,087,058 | 2/1992 | Miura et al. . |

FOREIGN PATENT DOCUMENTS

| | | | |
|---|---|---|---|
| 0094616 | 11/1983 | European Pat. Off. ........ 277/235 B |
| 200859 | 11/1983 | Japan ........................... 277/235 B |
| 118548 | 6/1986 | Japan ........................... 277/235 B |

Primary Examiner—Scott W. Cummings
Attorney, Agent, or Firm—Dykema Gossett

[57] ABSTRACT

A gasket has two outer facing layers positioned on opposite sides of a central metal shim with a perforated core disposed between each facing layer and the shim. The width of the metal shim may be varied to control the overall width of the gasket. The core is secured to the shim using a thermosetting adhesive and includes tangs which extend into a facing layer to clinch the core and facing layer together. The use of a perforated core prevents blistering of the facing layers during gasket manufacturing. The two perforated metal cores separated by an adjustable width shim provides manufacturing advantages, minimizes facing layer thickness, and adds strength.

7 Claims, 1 Drawing Sheet

REINFORCED CORE HEAVY DUTY GASKET

BACKGROUND OF THE INVENTION

The present invention relates to an improved thermally conductive composite gasket for an internal combustion engine having improved strength characteristics and variable thickness.

A thermally conductive gasket having high strength, particularly in the radial direction, is essential in heavy duty applications. It has been proposed in the past to bond a facing layer to both faces of a heavy gauge solid metal shell. The metal shell provides strength while the facing layer facilitates the conformability of the gasket to its mating surfaces. Unfortunately, it has been difficult to practically achieve a gasket having a metal layer bonded to a facing layer. Under high loads, portions of the facing layer may begin to separate or slide relative to the metal shell. Further, there are manufacturing difficulties in bonding a solid metal core to a facing layer. Typically, a thermosetting adhesive is required for the bonding process. A thermosetting adhesive has the advantage of being able to withstand high temperatures such as those experienced within internal combustion engines. However, when a thermosetting adhesive is initially set, gases are generated, particularly from the adhesive itself. The generated gases are unable to escape and blistering of the facing layer typically results, lowering the effectiveness of the gasket.

SUMMARY OF THE INVENTION

A disclosed thermally conductive gasket for an internal combustion engine includes a central metal shim with outer facing layers positioned on opposite sides of the shim. A perforated metallic core with opposing first and second planar faces is secured to each of the layers and bonded to the shim.

The adhesive can withstand high temperature operation after setting. The facing layers and perforations in the cores enable gases formed during coating and setting of the adhesive to escape, minimizing blistering of the facing layers.

The cores and central shim provide higher strength, particularly in the radial direction. Tangs mechanically clinch a core to a facing layer to minimize facing layer separation and slippage under high load conditions.

The use of a central metal shim provides a number of advantages. The thickness of the facing layers may be minimized, increasing gasket strength without sacrificing conformability. Further, it is possible to construct thicker gaskets by simply varying the shim metal thickness.

BRIEF DESCRIPTION OF THE DRAWINGS

The features and inventive aspects of the present invention will become more apparent upon reading the following detailed description, claims, and drawings, of which the following is a brief description:

DESCRIPTION OF A DETAILED EMBODIMENT

Figure 1:
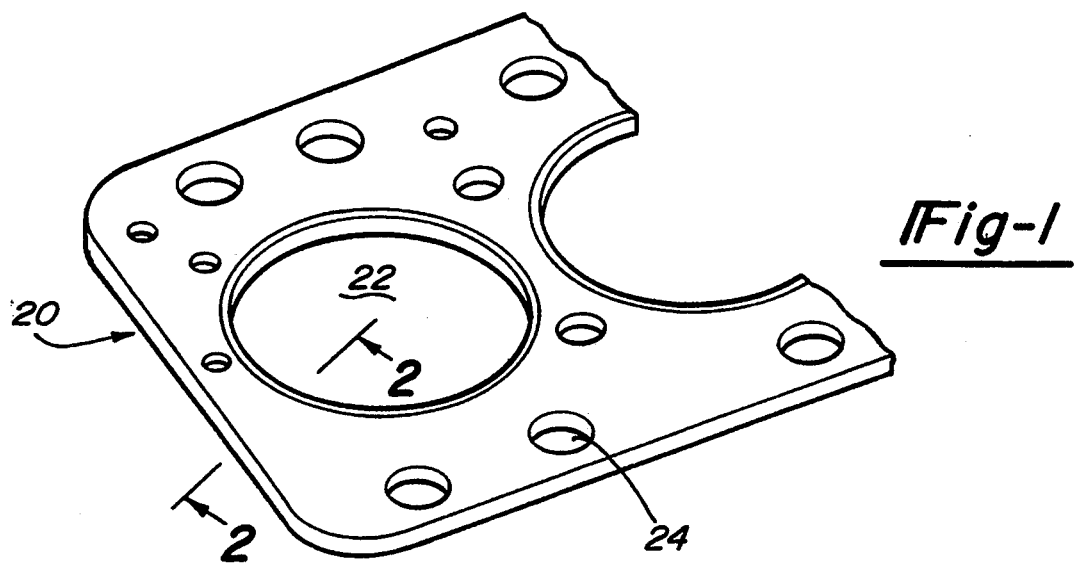
FIG. 1 is a perspective view of a portion of a gasket incorporating the present invention.
Figure 2:
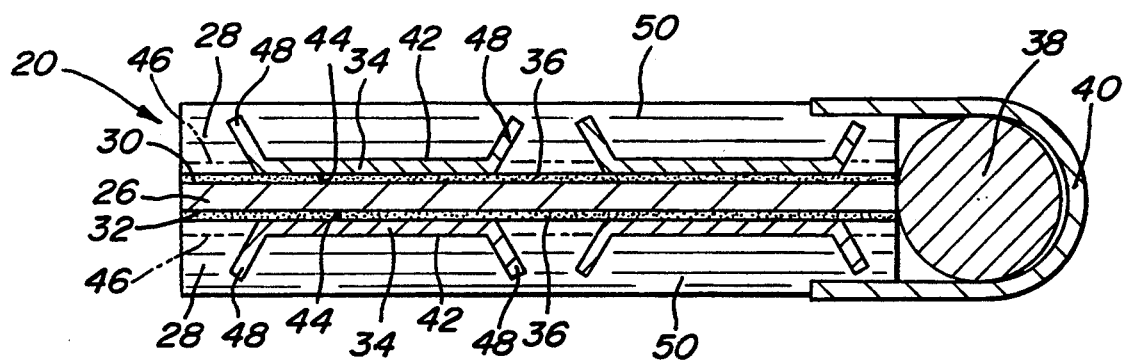
FIG. 2 is a cross-sectional view of a first embodiment of the present invention taken along line 2—2 of FIG. 1.

A cylinder head gasket 20 illustrated in FIG. 1 provides a combustion seal at cylinder bore openings 22, and at fluid flow openings 24. FIG. 2 illustrates a first embodiment of the present invention. Gasket 20 includes a central metal shim 26 with outer facing layers 28 positioned on opposite sides 30 and 32 of shim 26. A perforated metallic core 34 is disposed between each of layers 28 and shim 26. Core 34 is secured to facing layer 28 by clinching, and bonded to shim 26 by using a layer of thermosetting adhesive 36. A fire ring 38 is held in place using a fire ring holder 40.

Each core 34 includes a planar face 42 contacting an inner surface 46 of layer 28 with a pair of tangs 48 extending outwardly from planar face 42 and into facing layer 28. Each facing layer is thereby clinched to a core via the tangs, wherein the tangs impart additional strength to the facing layer and minimize the possibility of facing layer separation or slippage under high load conditions.

Thermosetting adhesive 36 has the characteristic of setting upon the application of heat to provide a bond that withstands high temperature engine operation. Preferred thermosetting adhesives include nitrile phenolic, silicones, and acrylics.

In practice, difficulties have arisen in using a thermosetting adhesive to bond a central metal shim to a facing layer. The heat used to set adhesive 36 generates gases from oils on the gasket components as well as from adhesive 36 itself. Blistering of facing layers 28 may result, reducing the effectiveness of the gasket. Therefore, in the preferred embodiment of the present invention, gas release paths are provided by the perforated metal. The adhesive does not limit the effectiveness of these paths. The perforated metal is preferably low carbon or stainless steel. It is preferred that the perforated metal be light gauge, having a thickness ranging between 0.006 and 0.012 inches (0.15 to 0.30 mm). Perforated metal of such a thickness may be economically manufactured.

The preferred facing layer 28 is formed from an expanded graphite material which operates to conduct heat away from fire ring 38 and holder 40. It is desirable to make facing layers 28 as thin as possible to reduce material and manufacturing cost, and lower the resistance to gas passage. Preferably, facing layers 28 have a thickness of at least 0.01 inches (0.25 mm), but no greater than 0.045 inches (1.14 mm).

Metal shim 26 provides a number of advantages, including increased gasket strength and the convenience of constructing thicker gaskets by simply varying the shim material or thickness. As a result, the thickness of the facing layers may be minimized, without compromising gasket strength. The ability to vary shim thickness is of particular importance in service situations involving rebuilding and resurfacing of engine hardware. Shim 26 is preferably made from steel and has a range of thicknesses from at least 0.005 inches (0.13 mm) to 0.25 inches (6.35 mm). Shim 26 may include a coarse surface finish, providing additional avenues for the escape of gases during the adhesive setting process as well as additional surface area for bonding with cores 34.

A method of making a gasket 20 according to the present invention includes the steps securing a core 34 to each of a pair of outer facing layers 28, placing shim 26 between facing layers 28 and bonding cores 34 to shim 26 using thermosetting adhesive 36. The adhesive is set or cured by placing a heated surface such as a platen or roller (not shown) in facial contact with an outer surface 50 of facing layers 28. To further promote gas release during the setting process, the heated surface may preferably have a coarse surface finish to provide a path for the escaping gases to follow.

Figure 3:
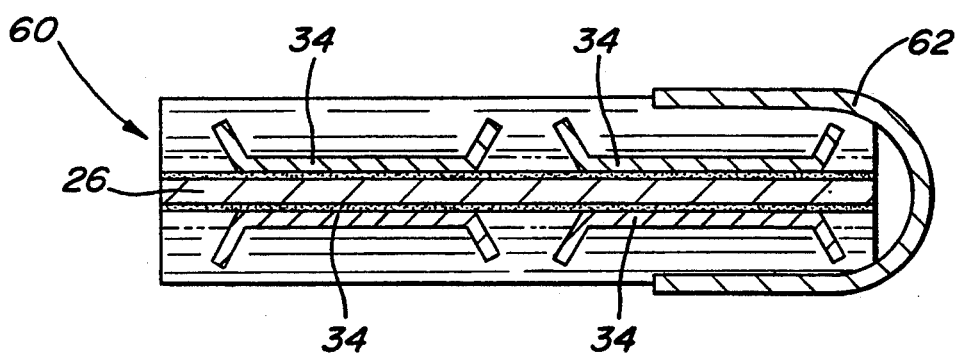
FIG. 3 is a cross-sectional view of an alternative embodiment of the present invention.

FIG. 3 shows an alternative gasket embodiment 60. The use of shim 26 in conjunction with cores 34 provides sufficient radial strength to permit the use of a simple combustion opening flange member 62 in place of the fire ring 38 and holder 40 shown in FIG. 2. This reduces material and manufacturing costs.

Preferred embodiments of the present invention have been described. It is to be understood that variations and modifications may be employed without departing from the scope of the present invention. Accordingly, the following claims should be studied to determine the true scope of the present invention.

We claim:

1. A gasket of an internal combustion engine comprising:
   a central metal shim;
   a pair of outer facing layers positioned on opposite sides of said shim;
   a core disposed between each of said facing layers and said shim, said cores including opposing first and second planar faces, said first planar face of said cores positioned against one of said facing layers, wherein said cores include at least one tang extending away from said first planar face into said one of said facing layers to clinch said cores to said one of said facing layers; and
   an adhesive bonding said second planar face of said cores to said shim.

2. A gasket as recited in claim 1, wherein each of said facing layers comprise an expanded graphite material.

3. A gasket as recited in claim 2, wherein said facing layers have a thickness in the range of 0.01 to 0.045 inches (0.25 to 1.14 mm).

4. A gasket as recited in claim 1, wherein said shim is made from steel and has a thickness of at least 0.005 inches (0.13 mm).

5. A gasket of an internal combustion engine comprising:
   a central metal shim;
   a pair of outer facing layers positioned on opposite sides of said shim;
   a core disposed between each of said facing layers and said shim, said cores including opposing first and second planar faces, said first planar face to said cores position against one of said facing layers, wherein said cores are metallic and further, wherein said cores are perforated, enabling gases to escape during setting of said adhesive to minimize blistering of said facing layers; and
   an adhesive bonding said second planar face of said cores to said shim.

6. A cylinder head gasket of an internal combustion engine comprising:
   a central metal shim;
   a pair of outer facing layers formed of graphite and positioned on opposite sides of said shim;
   a metallic perforated core disposed between each of said facing layers and said shim, said cores having opposing first and second outer planar faces, said first planar face in contact with and secured to an inner surface of one of said facing layers; and
   an adhesive disposed between said second planar face of each of said cores and said shim, said perforated cores allowing gases to escape during setting of said adhesive to minimize blistering of said facing layers.

7. A cylinder head gasket as recited in claim 6, wherein said shim includes a coarse surface finish to provide additional area for bonding and additional paths for escape of gas.

* * * * *